United States Patent [19]

Winter et al.

[11] Patent Number: 4,715,449
[45] Date of Patent: Dec. 29, 1987

[54] SELF-DUMPING CROP SHIELD

[75] Inventors: David C. Winter, Johnston; William R. Wood, Ames, both of Iowa

[73] Assignee: Deere & Company, Moline, Ill.

[21] Appl. No.: 884,458

[22] Filed: Jul. 11, 1986

[51] Int. Cl.$^4$ .............................................. A01B 39/26
[52] U.S. Cl. .................................. 172/513; 172/624.5
[58] Field of Search ............... 172/512, 513, 509, 307, 172/624.5

[56] References Cited

U.S. PATENT DOCUMENTS

| Re. 23,154 | 10/1949 | Johnson | 172/307 |
| 640,444 | 1/1900 | Colbert | 172/509 |
| 1,581,227 | 4/1926 | Pratt | 172/513 |
| 1,617,239 | 2/1927 | Eichsteadt | 172/513 |
| 2,319,047 | 5/1943 | Fell | 172/509 |
| 2,417,597 | 3/1947 | Hill | 172/512 |
| 2,718,185 | 9/1985 | Shawd | 172/512 |
| 3,115,169 | 11/1984 | Mattson | 172/512 |
| 4,623,024 | 11/1986 | Schlenker | 172/624.5 |

OTHER PUBLICATIONS

John Deere Advertizing Literature, 885 No-Till/Ridge Till Row-Crop Cultivator

Primary Examiner—Richard J. Johnson

[57] ABSTRACT

A crop sheild is connected to the aft ends of a pair of parallel links by a bracket assembly which can pivot to permit the shield to dump trash. The bracket assembly is pivotally connected to the aft end of the lower link and includes a slot slidably received on a pin located on the aft end of the upper link to maintain the links in a generally parallel relationship. The weight of the shield normally biases the shield to a horizontal field-working position with the end of the slot stopped against the pin. When trash builds up, the shield pivots with respect to the lower link and the slot slides over the pin as the shield moves up against the bias over the trash. Dump forces are reduced since the shields pivot independently of the parallel links.

14 Claims, 3 Drawing Figures

SELF-DUMPING CROP SHIELD

BACKGROUND OF THE INVENTION

The present invention relates generally to agricultural implements, and more specifically, to shields which protect plants from soil throw during cultivation.

Several types of crop shields are available to shelter crops from excessive soil throw during cultivation. Rolling shields are used to protect the plants and travel through the field like a wheel adjacent the rows of plants and adjacent the outside sweeps. Although rolling shields can roll over most trash which they encounter in their way, some trash conditions can cause the shields to block and result in damaged crops and a messy field condition. By their nature, rolling shields can only protect a small area of the crop adjacent the axis of rotation of the shields. Also, some rolling shields cannot be effectively used in extremely tall crops without damage to the crops.

Compared to rolling shields, conventional fore-and-aft extending rig-mounted shields provide an increased area of protection for the crops adjacent the cultivator sweeps. Such shields are generally hung in place and, unless adjusted manually, either do not move or simply hang from parallel arms that swing back. When used with no-till or ridge-till practices which leave a large amount crop residue on the soil surface, the rig-mounted shields tend to plug and cause crop to be destroyed. Also, the plugging causes clumps of trash mixed with soil to build up at areas in the field where the blockage has taken place. The force necessary to move rockable shields and release blockages is often so large that unsightly and destructive clumps form before they are released.

OBJECTS OF THE INVENTION

It is therefore a principal object of the present invention to provide an improved crop shield. It is a further object to provide such a crop shield which is less subject to blockage than at least most of the previously available shields and yet adequately protects the crop from soil throw. It is another object to provide such a shield which can rock to shed blockages and wherein the force necessary to rock the shield is relatively small so that the amount of residue which the shield accumulates is reduced.

It is still another object of the invention to provide an improved crop shield for use with no-till or ridge-till cultivators. It is another object to provide such a crop shield with improved trash shedding capabilities. It is still a further object to provide such a crop shield which is easily adjusted for crop size and row spacing.

It is a further object of the invention to provide an improved crop shield which is adjustable vertically with little fore-and-aft movement and yet which is able to pivot to shed blockages easily and thereafter quickly return to the normal field-working position. It is still another object to provide such a shield which pivots about an axis offset a substantial distance above the shield.

BRIEF DESCRIPTION OF THE INVENTION

In accordance with the above objects, a shield arrangement is provided including a pair of parallel links extending rearwardly from a transverse support connected to a cultivator rig. Angle brackets are connected to the aft end of the links, and a pair of supports are bolted to and extend downwardly from the angles. A pair of shields is connected to the supports and extends rearwardly therefrom in plant protecting relationship with the row of crops to be cultivated. The angles which carry the supports and the shields are pivotally connected to the aft end of the lower link. The upper end of each of the angles includes an arcuate slot which is slidably carried by a pin connected to the aft end of the upper link so that the angles may pivot about their connection with the aft end of the lower link. If the shields become plugged with trash, the slotted pivoting angles permit the shields to rock back to dump the trash. Thereafter, the shields pivot downwardly to the normal field-working position. A link chain assembly permits the shields to be adjusted vertically on the parallel linkage with little fore-and-aft movement so that proper crop shielding characteristics are maintained. Under normal operation, the shields are maintained in generally the same horizontal attitude parallel with the ground even as the shields and links are adjusted for operation at different heights. When a blockage or other large obstacle is encountered, the slots in the angles permit the shields to rock upwardly about the pivotal connection with the lower link to dump the obstacle and avoid crop damage and litter in the field. The pivot and slot arrangement of the angle brackets permits obstructions to pass and eliminates slots in the shield or additional costly pivot areas while reliably maintaining the shields in the proper attitude under normal operating conditions. Since less force is required to pivot the shields than to lift them, the amount of residue the shields accumulate before dumping is reduced for a cleaner field and less crop damage.

These and other objects, features and advantages of the present invention will become apparent to one skilled in the art upon reading the following detailed description in view of the drawings.

DESCRIPTION OF THE PREFERRED EMBODIMENT

Figure 1:
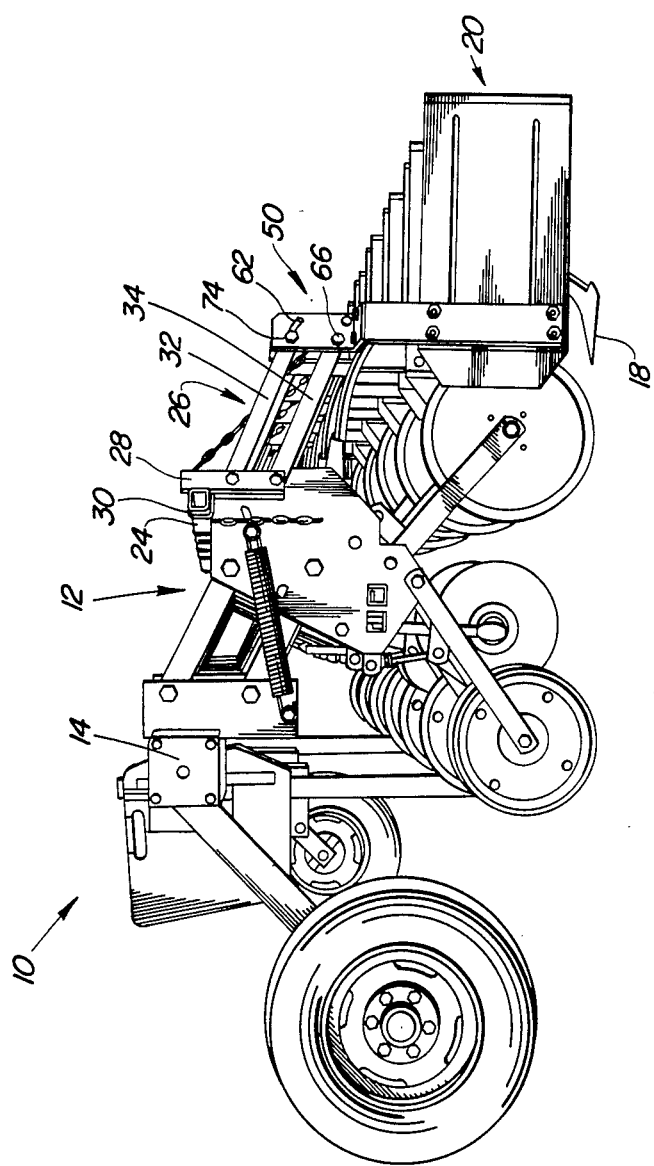
FIG. 1 is a side view of a cultivator with the shield arrangement of the present invention attached thereto.
Figure 3:
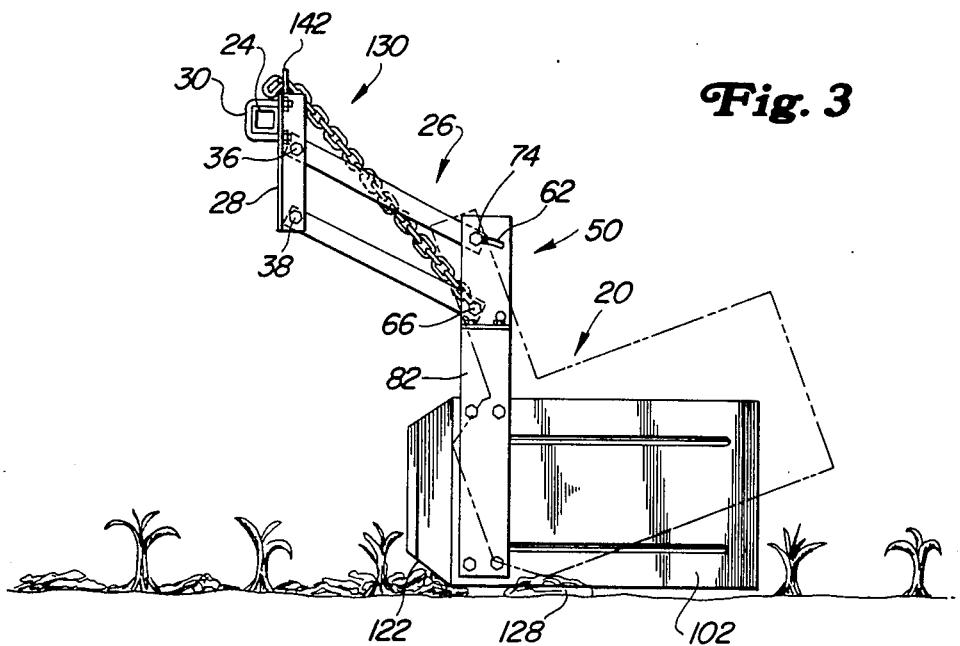
FIG. 3 is a side schematic view of the shield arrangement in the normal operating position (solid lines) and in the rocked dump position (broken lines).

Referring now to FIG. 1, there is shown a cultivating implement 10, such as a row-crop cultivator, including a plurality of cultivating rigs 12 transversely spaced on a tool bar 14 adapted for towing forwardly over a field of row crops by a tractor (not shown). The cultivator rigs 12 include soil working implements 18 which can cause soil throw towards the plants (FIG. 3) during the cultivating operation. To protect the plants against injurious soil throw, shield assemblies 20 are mounted on the cultivating rigs 12 for support adjacent the rows.

The shield assemblies 20 include a transverse support beam 24 fixed to and extending transversely outwardly from the cultivator rig 12'. A parallel linkage arrangement 26 is connected to the support beam 24 by a pair of hanger angles 28. The upper ends of the angles 28 are connected by U-Bolts 30 to the support beam 24.

The parallel linkage 26 includes upper and lower tubular beams 32 and 34 having forward ends sandwiched between the rearwardly extending flanges of the hanger angles 28 and pivotally connected thereto by upper and lower pivot pins 36 and 38 extending through holes in the brackets and through corresponding bushing assemblies 42 and 44 located in the forward ends of the links 32 and 34, respectively.

In the preferred embodiment, the links 32 and 34 are of substantially equal length, and the aft end of the links support bushing assemblies 46 and 48 for mounting an angle bracket assembly 50. The angle bracket assembly 50 includes left- and right-hand angles 52 and 54 which are substantially mirror images of each other. Each of the angles 52 and 54 includes a slotted upright portion 56 and an outwardly turned flange 58. The upper end of the portion 56 includes an arcuate slot 62 terminating adjacent the forward edge of the portion. An aperture 64 is located directly below the forward end of the arcuate slot 62, and the angles 52 and 54 are pivotally connected to the lower link 34 by a pin 66 passing through the apertures 64 and through the bushing assembly 48. A spacer 70 is secured between the lower rear edges of the upright portions 56 by a bolt 72 extending through apertures 74 in the portions 56. The spacer 70 constrains the angles 52 and 54 for rotation together about the axis of the pin 66 while supporting the angles closely adjacent the sides of the links 32 and 34. The spacer 70 is approximately equal to, but slightly longer than, the width of the links 32 and 34 and is located out of interfering relationship with the aft end of the lower link 34 to permit free pivoting of the angle bracket assembly 50 about the pin 66.

Figure 2:
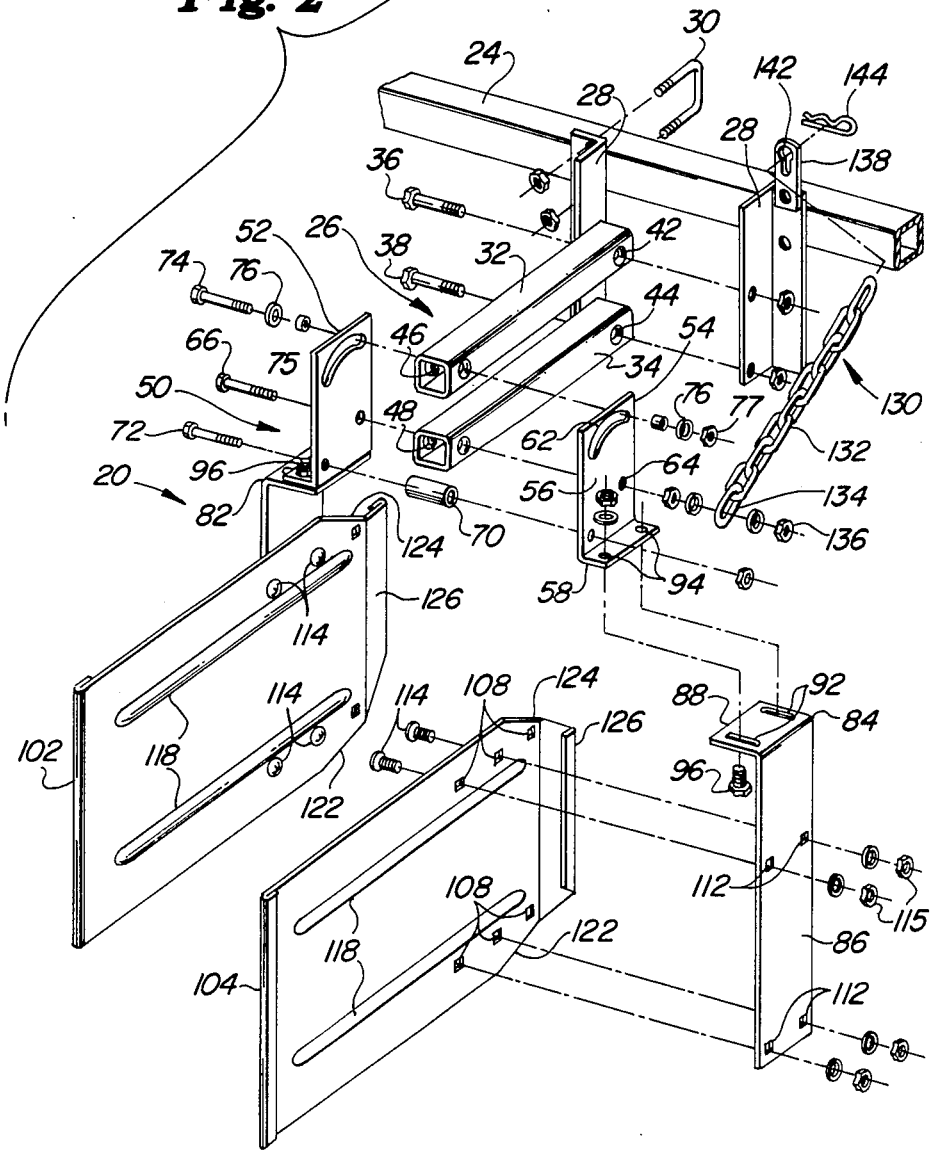
FIG. 2 is an exploded view of the shield attachment shown in FIG. 1.

The arcuate slots 62 have a radius R centered on the aperture 64, with the dimension R preferably being equal to the spacing between the forward pivot pins 36 and 38 so that the links 32 and 34 are maintained in a parallel relationship by a pin 74 and trunnions 75 extending through the slots 62. The pin 74 passes through the upper bushing assembly 46 and maintains the trunnions 75 in the respective slots 62 between a pair of washers 76 secured by a lock nut 77 closely adjacent the bushing assembly 46. In the normal operating position, the angle bracket assembly 50 is biased by the weight of the shield assembly in the clockwise direction (FIG. 2) with the forward edges of the slots 62 contacting the trunnions 75 on the pin 74. In this normal field-working position, the flanges 58 are substantially horizontal.

Connected to and extending downwardly and outwardly from the angles 52 and 54 are left- and right-hand angle brackets 82 and 84 which are substantially identical to each other in construction and include an upright apertured portion 86 and an inwardly directed slotted flange 88 adapted for connection to the flange 58 of the angle bracket assembly 50. Slots 92 located in the flanges 88 are adapted for alignment with apertures 94 in the flanges 58, and bolts 96 are inserted through the slots 92 and corresponding apertures 94 to secure the brackets 82 and 84 to the angle bracket assembly 50.

Left- and right-hand shields 102 and 104 are connected to the inwardly facing surfaces of the apertured upright portions 86 of angle brackets 82 and 84, respectively. The shields 102 and 104 are substantially mirror images of each other and are apertured adjacent their forward upper and lower portions at 108. The apertures 108 are alignable with apertures 112 in the upright portions 86. Bolts 114 are inserted through the apertures 108 and the corresponding apertures 112, and lock nuts 115 are threaded onto the ends of the bolts 114 to secure the shields 102 and 104 to the corresponding brackets 82 and 84, respectively. The shields 102 and 104 can be adjusted fore-and-aft with respect to the brackets 82 and 84 by changing the hole locations 108 through which the bolts 114 pass.

A major portion of the shields 102 and 104 from the aft ends forwardly are rectangular and generally planar in configuration except for a pair of reinforcing ribs 118 extending along a substantial portion of the length of the shield. The forward ends of the shields 102 and 104 are tapered upwardly at locations 122 and downwardly at 124 to an outwardly diverging forward end 126 adapted for channeling the plants being cultivated between the main portion of the shields 102 and 104. As can be seen from the figures, a substantial portion of the mass of the shields 102 and 104 is located rearwardly of the axis of the pivot pin 66 for the angle bracket assembly 50 so that the shield assembly 20 remains rocked to the clockwise-most (FIGS. 1 and 3) position about the pin 66 during normal operation. When a large obstacle is encountered or a clump of trash, such as shown at 128 in FIG. 3, builds up on the shield assembly 20, the shields 102 and 104 can rock in the counterclockwise direction (broken lines of FIG. 3) about the axis of the pin 66 to pass the obstacle or clump of trash.

To adjust the lowermost position of the shields 102 and 104 in their field-working positions, and to raise the shields as the cultivator is raised to the transport position, a link chain assembly 130 is connected between the pivot pin 66 and the top portion of the corresponding hanger angle 28. The assembly 130 includes a link chain 132 having an aft link 134 adapted for receipt by the end of the pin 66 and secured thereon by a nut 136. A chain support 138 is bolted to the angle 28 by the corresponding U-Bolt 30 and includes a key-hole slot 142 for receiving a selected one of the forward links of the chain 132. The selected link is secured within the slot by a pin 144. The lowermost field-working position of the shields 102 and 104 can be adjusted by changing the link which is secured within the slot 142. The shields 102 and 104 generally do not touch the ground during normal operation.

In the field-working position, the shields 102 and 104 are maintained in a substantially horizontal attitude with the forward ends of the slots 62 of the angle bracket assembly 50 contacting the trunnions 75 on the pin 74. The parallel linkage 26 normally does not move during field operation and maintains the shields 102 and 104 in the horizontal attitude. If a blockage of trash or the like should occur on the shield assembly, the shields can rock upwardly about the pin 66 as the slots 62 move with respect to the pin 74. The shields 102 and 104 rock upwardly in the counterclockwise direction (FIG. 3) until the blockage clears itself, at which time the weight of the shields 102 and 104 rearwardly of the axis of the pin 66 causes the shields to return to their normal horizontal, fieldworking position. The slots 62 allow the shields 102 and 104 to dump when they become plugged with trash and yet still permits adjustment of the shields vertically on the parallel linkage 26 with little fore-and-aft movement of the shields 102 and 104. Dump forces are reduced since the linkage 26 does not have to pivot. The slots 92 in the angles 82 and 84 permit the shields to be adjusted transversely to the row for varying crop types and crop maturity.

Having described the preferred embodiment, it will be apparent that modifications can be made without departing from the scope of the invention as defined in the accompanying claims.

We claim:

1. In a cultivating implement adapted for forward movement over the ground and having earthworking tools transversely spaced on a frame for cultivating soil containing trash between parallel rows of plants, shield structure for protecting the plants from soil throw, said structure comprising:

a fore-and-aft extending plant shield;

upright support structure connected to and extending upwardly from the shield;

linkage structure having a forward end connected to the implement frame and extending rearwardly from the frame to a rear portion, said linkage structure comprising upper and lower fore-and-aft extending links;

means pivotally connecting the upper end of the support structure to the rear portion of the linkage structure for rocking about a transversely extending axis located a substantial distance above the plant shield to thereby permit the shield to rock vertically about the axis between a lower crop shielding position and a raised trash-dumping position; and wherein the support structure includes means for limiting the downward rocking of the shield to the lower crop-shielding position and permitting upward rocking of the shield toward the trash-dumping position, said means for limiting the downward rocking including pin means connected to the aft end of one of the links and wherein said means pivotally connecting the upper end is connected to the aft end of the other of the links for maintaining the shield in a preselected atttiude when in the crop-shielding position.

2. The invention as set forth in claim 1 including bracket means pivotally attaching the forward ends of the links to the implement frame in generally parallel relationship.

3. The invention as set forth in claim 1 wherein the support structure includes an arcuate slot located on the arc of a circle of radius R centered on the transverse axis and the pin means is slidably received in the slot.

4. The invention as set forth in claim 2 wherein said means pivotally connecting is connected to the lower link; and the links, bracket means and support structure define a four-bar linkage arrangement for maintaining the shield in a generally horizontal attitude when in the crop-shielding position.

5. In a cultivating implement adapted for forward movement over the ground and having earthworking tools transversely spaced on a frame for cultivating soil containing trash between parallel rows of plants, shield structure for protecting plants from soil throw, said structure comprising:

first and second fore-and-aft extending links;

means connecting the forward ends of the links to the implement frame in vertically spaced relationship for rocking vertically about first and second transverse axes;

a fore-and-aft extending shield arrangement adapted for receiving and shielding a row of crops; and means connecting the shield arrangement to the aft ends of the links for movement vertically therewith, said means connecting including upright bracket means having a lower and connected to the forward end of the shield arrangement and an upper end extending a substantial distance above the shield arrangement, and means pivotally connecting the upper end to a one of the links for rocking about a transverse axis to permit the shield arrangement to rock rearwardly and upwardly about the axis from the crop-shielding attitude, said means connecting further including means for maintaining the shield arrangement in a preselected crop-shielding attitude as the shield arrangment moves vertically with the links.

6. The invention as set forth in claim 5 wherein the bracket means is pivotally connected to the aft end of the first link for permitting rocking of the shield arrangement with respect to said first link independently of rocking of said first link.

7. The invention as set forth in claim 6 wherein the bracket means includes means connected to the aft end of the second link for maintaining the links generally parallel as the shield arrangement moves vertically with the links.

8. The invention as set forth in claim 6 wherein the first link is located below the second link and the bracket means includes a slotted upper portion, and pin means extending through the slotted portion and connected to the aft end of the upper link.

9. The invention as set forth in claim 8 wherein the slotted portion includes an end portion adapted to engage the pin means to prevent downward working of the shield arrangement with respect to the lower link below the crop-shielding position.

10. The invention as set forth in claim 6 wherein the bracket comprises transversely spaced side members, said aft ends of the links being located between the side members, a pivot pin rockably connecting the bracket to the first link, and wherein said side members include slotted portions, and a pin captured in the slotted portions and connected to the second link.

11. The invention as set forth in claim 10 wherein the pivot pin defines a bracket pivotal axis and the slotted portions include arcuate slots each having a radius R centered on the bracket pivotal axis for maintaining a preselected spacing between the aft ends of the links.

12. The invention as set forth in claim 10 including spacer means sandwiched between the side members generally out of interfering relationship with the links for maintaining a preselected spacing between the side members so that the bracket can pivot freely about the pivot pin.

13. The invention as set forth in claim 11 wherein the means connecting the forward ends of the links comprises upper and lower pivot pins spaced a distance R apart for maintaining the links in parallel relationship.

14. The invention as set forth in claim 13 including means for limiting the downward rocking of the links about the respective upper and lower pivot pins to a preselected lowermost position.

* * * * *